J. A. TILDEN.
METER SYSTEM.
APPLICATION FILED DEC. 14, 1908.

971,510.

Patented Sept. 27, 1910.

Witnesses:
Joseph A. Jately
James E. Lynch

Inventor:
James A. Tilden
by Sylvanus H. Cobb
Atty.

UNITED STATES PATENT OFFICE.

JAMES A. TILDEN, OF HYDE PARK, MASSACHUSETTS, ASSIGNOR TO HERSEY MANUFACTURING COMPANY, OF SOUTH BOSTON, MASSACHUSETTS, A CORPORATION OF MAINE.

METER SYSTEM.

971,510.   Specification of Letters Patent.   Patented Sept. 27, 1910.

Application filed December 14, 1908. Serial No. 467,390.

*To all whom it may concern:*

Be it known that I, JAMES A. TILDEN, a citizen of the United States, residing at Hyde Park, in the county of Norfolk and State of Massachusetts, have invented a new and useful Meter System, of which the following is a specification.

This invention relates to means for measuring the quantity of liquid flowing through conduits, and more particularly to cases in which the flow varies from a minimum, accurately measurable only by a small and sensitive meter, to a large volume approaching the maximum capacity of the main conduit. Obviously, the latter condition, to avoid material loss of pressure, demands a practically uninterrupted passage, and the presence of a small meter would defeat this requirement. In fact, for some purposes, such as fire-service, the underwriters' rules render freedom from such obstruction essential. I attain the desired end by directing moderate quantities of fluid through a by-pass containing a suitably sensitive meter, and providing in the main line, acted upon only by relatively excessive flows, a meter which decreases the effective area but little, and the efficiency of which is dependent upon the presence of the by-pass. My invention also includes means whereby an indication is given of conditions existing in the system.

Figure 1:
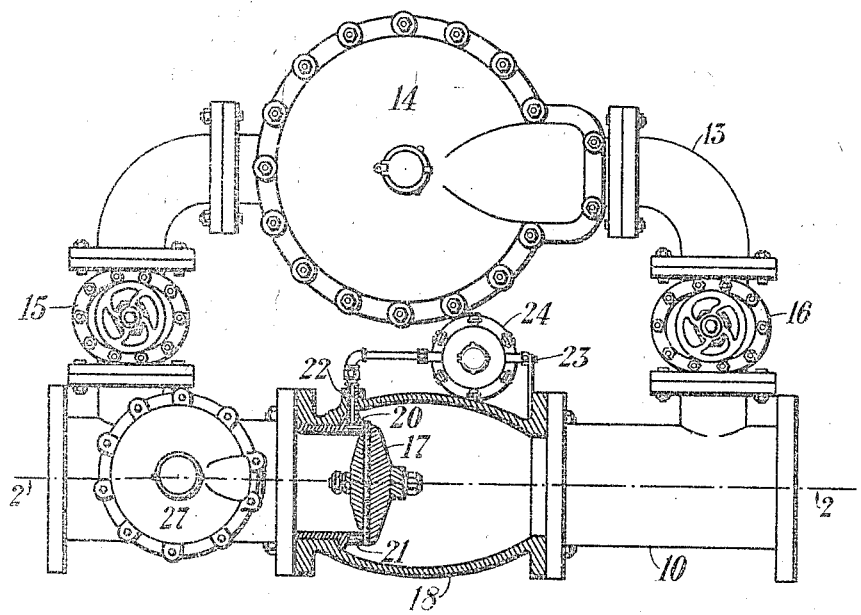
Figure 2:
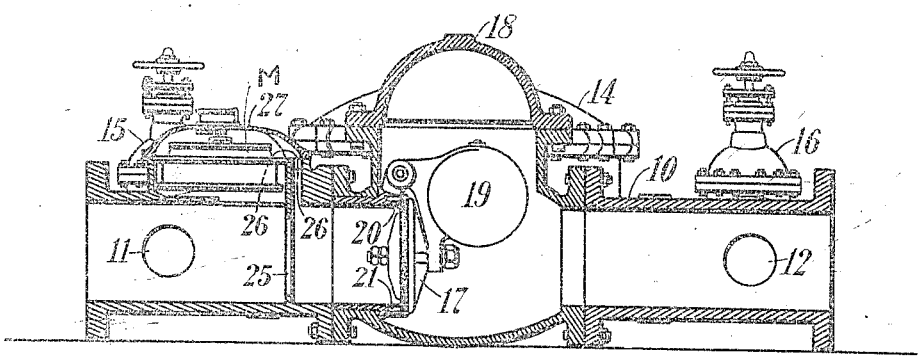

In the accompanying drawing, in which similar characters designate like parts throughout the several views, Figure 1 is a top plan view of one embodiment of my improved system, with the check-valve in section; and Fig. 2 is a vertical section on the line 2—2 of Fig. 1.

A portion of the main line of a fluid-supply system is shown at 10, in the form of a pipe or conduit of sufficient cross-sectional area to provide for the desired maximum flow. Leading from an induction-opening 11 to an eduction-opening 12 is a by-pass conduit 13 in which is a meter 14, which may be any positive and sufficiently sensitive apparatus as, for example, one of the disk-type. Valves 15 and 16 are preferably included in the by-pass adjacent to the main conduit permitting communication between the two to be shut off.

In the main conduit between the by-pass openings is automatic controlling means for maintaining the conduit closed under relatively small flows, this being shown as supplied by a check-valve having a disk 17 operating in a casing or body 18. The valve is weighted at 19 and swings from its seat 20 toward the eduction-opening of the by-pass. In the seat and closed by the valve in its contact therewith is an opening connected with the atmosphere. This opening may be furnished by a continuous annular depression 21 or by a plurality of connected depressions, these in either case communicating with a passage 22 through the casing. From the passage a waste or outlet pipe 23 leads to any desired point outside the system and may have in it a small meter 24.

Between the check-valve and the eduction-opening of the by-pass is a meter M, which, while being reasonably accurate, must not offer a resistance which will materially diminish the pressure in the main conduit. For this purpose I prefer to employ a proportional meter of the type described in my Patent No. 797,027, dated August 15, 1905, in which a predetermined portion of the total amount is measured. The flow of the assumed and directly measured volumes is through a resistance device in the main conduit and through the meter by-pass respectively, said resistance device and meter offering a resistance of the same character. In the present instance, there is illustrated in the conduit 10 a diaphragm 25 having a large axial opening, and a secondary by-pass 26 through the main conduit wall and through the casing and measuring elements of a disk or other suitable meter 27.

Considering the general operation of my improved meter system, normally the check-valve will be kept upon its seat by the weight 19 and by the differential static pressure upon the two faces. The latter exists because of the decreased effective area upon the side which covers the opening 21 in the valve-seat, the excess pressure upon the opposite side being transmitted through the by-pass 13. At this time the fluid passing is entirely measured by the meter 14. If now the draft upon the system is increased beyond a certain amount, the by-pass will be unable to maintain the excess of pressure upon the eduction side of the check-disk, and that upon the opposite side overcomes the weight of the valve and raises it, allowing the passage of the fluid through the main conduit. If the weight alone were depended upon to maintain the normal closure of the valve, its action in opening would be slow and uncertain, hanging for an appreciable time near the seat and oscillating as it gradually rose. With the differential pressure serving as the chief agency for holding the valve closed, its break from the seat occurs sharply at the predetermined point, there at once being ample pressure to effect a complete opening. As the disk approaches a horizontal position the center of gravity of the weight 19 will be more nearly over the pivot and the valve thereafter offers but slight resistance to the flow. The volume of fluid passing through the check-valve is within the range of accurate measurement of the proportional meter, this having been reached instantaneously, as has just been pointed out. When this flow encounters the resistance of the diaphragm 25, a definite portion of the total quantity is forced through the by-pass 26 as indicated by the arrow in Fig. 2, and this amount, or, if desired, the total amount, is registered upon the meter 27. In this connection, it is desired to call particular attention to the peculiar coöperation between the by-pass 13 and the proportional meter. It will be clear that to cause the meter 27 to register, a certain minimum volume must be diverted through the by-pass 26 by the action of the resistance device. Now if small flows were to be measured, it would be necessary to interpose a considerable resistance in the main conduit to render the fractional part entering the meter 27 large enough to operate thereon. This, however, would defeat the purpose of attaining a free path for greater volumes, since the contracted resistance-opening would throttle the flow. But since I dispose of these lesser volumes through the by-pass 13, and the check-valve by the magnitude of its weight and the differential pressure to which it is subjected may be regulated to open only for a large flow, it will then only require the presence of a relatively slight resistance in the main conduit to insure the passage of a measurable quantity of liquid through the meter 27. Therefore, the opening in the resistance device may approach closely to the total transverse area of the conduit. It will also be seen that by the employment of the differential effect to control the opening of the valve, there is eliminated from the system that gradually increasing initial flow which would be below the measuring capacity of the proportional meter, and which would escape unregistered. After the check-disk has been lifted from the seat a very small portion of the fluid will pass through the depression 21, passage 22 and pipe 25 and escape from the system. In so doing, it acts upon the meter 24, and from the reading thereof the time during which the check-valve was open, and the heavy flow taking place, may be approximately obtained, the capacity of the discharge-opening of pipe 23 in gallons per minute under the average pressure being known. Of course, the discharge of fluid from the pipe 23, being visible, will serve as a transient indication of the condition existing in the system. Furthermore, this outlet passage from the valve seat and the main line meter serve as a reciprocal check upon each other. For example, if fluid be seen escaping from the pipe 23 and the meter 27 is not registering, it will be known that the latter is out of order. On the other hand, if registration upon the meter 27 is observed to be in progress without discharge from the pipe 23, it follows that the passage from the seat is choked and the valve is not securing the benefit of the hydrostatic differential to maintain its normal closure.

To consider a specific example of a practical application of my improved system, the general data will be given of a 6-inch main line intended for fire service, and in which it is desired to measure both the quantity necessary for such purposes and any small flow which might result from leakage or theft. With the main line having, as stated, a diameter of 6 inches, the by-pass 13 has a diameter of 3 inches and the measuring apparatus 14 is a 3-inch Hersey disk-meter. The diameter of the opening in the resistance device 25 is 4.75 inches and the secondary by-pass 26 contains a 1½-inch Hersey disk-meter. With a pressure in the system of 75 pounds per square inch, the area of the passage in the check valve seat, and the weight moving with the disk is such that the valve opens when the drop in pressure through the by-pass 13 between the opposite faces amounts to 4.5 pounds. Prior to this time water up to 150 gallons per minute will have traversed the by-pass 13, but when it is in excess of this the check valve opens and up to the maximum capacity, say 1,500 gallons per minute, will flow through the main line, of which about 7 per cent will be diverted through the by-pass 26. For the maximum flow the discharge from the system by the pipe 23 does not exceed 3 gallons per minute. In this pipe a 5/8 inch Hersey disk-meter is employed.

I claim as my invention:

In a meter system; a main conduit; a primary by-pass communicating therewith; a meter included in the primary by-pass and operable by a relatively small flow through the system; a proportional meter comprising a diaphragm in the main conduit between the openings of the primary by-pass, a secondary by-pass about the diaphragm, and a meter in the secondary by-pass, the diaphragm being provided with an opening closely approximating in diameter that of the main conduit, thus offering practically no resistance to flow therethrough and consequently being effective to divert a measurable quantity of liquid through the secondary by-pass only upon a relatively large flow through the system; and a check-valve situated in the main conduit between the primary by-pass openings and adapted to normally hold said main conduit closed and to open when a flow occurs sufficient to operate the secondary by-pass meter.

JAMES A. TILDEN.

Witnesses:
 HENRY D. WINTON,
 FRANCIS C. HERSEY, Jr.